US009623488B2

(12) United States Patent
Ono et al.

(10) Patent No.: US 9,623,488 B2
(45) Date of Patent: Apr. 18, 2017

(54) DRILL AND METHOD OF MANUFACTURING MACHINED PRODUCT

(71) Applicants: Fuji Jukogyo Kabushiki Kaisha, Shinjuku-ku, Tokyo (JP); KYOCERA Corporation, Kyoto (JP)

(72) Inventors: Yuzuru Ono, Handa (JP); Yoshifumi Koike, Higashiomi (JP); Hideaki Kataoka, Moriyama (JP)

(73) Assignees: KYOCERA CORPORATION, Kyoto (JP); FUJI JUKOGYO KABUSHIKI KAISHA, Tokyo (JP)

( * ) Notice: Subject to any disclaimer, the term of this patent is extended or adjusted under 35 U.S.C. 154(b) by 305 days.

(21) Appl. No.: 13/690,640

(22) Filed: Nov. 30, 2012

(65) Prior Publication Data

US 2013/0136552 A1    May 30, 2013

(30) Foreign Application Priority Data

Nov. 30, 2011  (JP) ................................ 2011-262668

(51) Int. Cl.
  *B23B 51/02*  (2006.01)
  *B23B 51/00*  (2006.01)
  *B23B 35/00*  (2006.01)

(52) U.S. Cl.
  CPC ............ *B23B 51/009* (2013.01); *B23B 35/00* (2013.01); *B23B 51/02* (2013.01); *B23B 2228/36* (2013.01); *B23B 2251/04* (2013.01); *B23B 2251/48* (2013.01); *B23B 2251/54* (2013.01); *Y10T 408/03* (2015.01); *Y10T 408/906* (2015.01)

(58) Field of Classification Search
  CPC ............. B23B 51/02; B23B 2251/242; B23B 2251/241; B23B 2251/48; B23B 2251/54

USPC ................. 408/223–225, 227, 230, 229
  See application file for complete search history.

(56) References Cited

U.S. PATENT DOCUMENTS

| 1,747,117 | A | * | 2/1930 | Klein ............................ 76/108.6 |
| 2,966,081 | A | * | 12/1960 | Kallio ............................ 408/230 |
| 3,387,511 | A | * | 6/1968 | Ackart, Sr. et al. ........... 408/230 |
| 4,826,368 | A | * | 5/1989 | Tikal et al. .................... 408/225 |
| 5,947,653 | A | * | 9/1999 | Hamberg ......................... 408/59 |
| 6,585,460 | B1 | * | 7/2003 | Meece et al. .................. 408/230 |
| 6,698,981 | B1 | * | 3/2004 | Beno et al. ..................... 408/59 |

(Continued)

FOREIGN PATENT DOCUMENTS

| JP | 56-076313 A | * | 6/1981 | .............. B23B 51/02 |
| JP | 2003-191116 A | * | 7/2003 | .............. B23B 51/00 |

(Continued)

OTHER PUBLICATIONS

Office Action dated Mar. 20, 2015 issued in counterpart Japanese application No. 2011-262668.

Primary Examiner — Sunil K Singh
Assistant Examiner — Ryan Rufo
(74) Attorney, Agent, or Firm — Procopio Cory Hargreaves and Savitch LLP

(57) ABSTRACT

A drill includes a substantially cylindrical cutting portion includes a first region located at a front end portion, and a second region which has a step whose diameter increases as going from the first region to a rear end in a sectional view perpendicular to a rotation axis, and which is continuous with the first region in an end of the second region on a side of the step, and using this drill, a method of manufacturing a machined product is provided.

19 Claims, 5 Drawing Sheets

(56) References Cited

U.S. PATENT DOCUMENTS

| | | | |
|---|---|---|---|
| 6,923,602 B2 * | 8/2005 | Osawa et al. | 408/230 |
| 7,296,954 B2 * | 11/2007 | Haenle | 408/227 |
| 8,393,831 B2 * | 3/2013 | Onozawa | 408/223 |
| 2003/0202853 A1 * | 10/2003 | Ko et al. | 408/225 |
| 2006/0060053 A1 * | 3/2006 | Tanaka et al. | 83/663 |
| 2006/0170787 A1 * | 8/2006 | Bentkovski | 348/222.1 |
| 2007/0020057 A1 * | 1/2007 | Chen | 408/224 |
| 2007/0134071 A1 * | 6/2007 | Reinhardt et al. | 408/230 |
| 2008/0219791 A1 * | 9/2008 | Nasu et al. | 408/223 |
| 2010/0254779 A1 * | 10/2010 | Wedner | 408/224 |
| 2012/0087753 A1 * | 4/2012 | Kataoka et al. | 408/1 R |
| 2012/0321403 A1 * | 12/2012 | Higashiwaki et al. | 408/223 |
| 2013/0134089 A1 * | 5/2013 | Cote | 210/605 |

FOREIGN PATENT DOCUMENTS

| | | | | |
|---|---|---|---|---|
| JP | 2003-205412 A | * | 7/2003 | ............ B23B 51/00 |
| JP | 2003-266223 A | | 9/2003 | |
| JP | 2007-007809 A | | 1/2007 | |
| JP | 2007-007831 A | | 1/2007 | |
| JP | 2008-000836 A | | 1/2008 | |
| JP | 2010-173007 A | * | 8/2010 | ............ B23B 51/00 |

* cited by examiner

DRILL AND METHOD OF MANUFACTURING MACHINED PRODUCT

CROSS-REFERENCE TO RELATED APPLICATIONS

The present application claims priority under 35 U.S.C. §119 to Japanese Patent Application No. 2011-262668, filed Nov. 30, 2011, the content of the application is incorporated herein by reference in their entirety.

BACKGROUND OF THE INVENTION (1) Field of the Invention

The present invention relates to a drill and a method of manufacturing a machined product.

(2) Description of Related Art

As a drill capable of forming, at a time, a stepped hole in which a diameter is varied in midstream and a chamfered hole whose opening is chamfered, a step drill is known (see JP 2007-7831 A for example).

However, a conventional step drill described in JP 2007-7831 A has a problem that discharging performance of chip is inferior. Hence, if a through hole is formed using the conventional step drill, the through hole is prone to be clogged with produced chip, and there is a problem that an inner wall surface of the through hole is damaged or a cutting edge becomes fractured.

SUMMARY OF THE INVENTION

It is an object of the present invention to provide a drill having excellent discharging performance of chip and to provide a method of manufacturing a machined product.

A drill according to an embodiment of the present invention including a substantially cylindrical cutting portion includes a first region located at a front end portion, and a second region which has a step whose diameter increases as going from the first region to a rear end in a sectional view perpendicular to a rotation axis, and which is continuous with the first region in an end of the second region on a side of the step, wherein the first region includes a plurality of first cutting edges located at a front end, a first outer peripheral portion located at an outer peripheral portion of the cutting portion, and a plurality of first flutes spirally located in the first outer peripheral portion from rear ends of the plurality of first cutting edges toward the rear end of the cutting portion, the second region includes a plurality of second cutting edges located at the step, a second outer peripheral portion located at the outer peripheral portion of the cutting portion, a plurality of second flutes spirally located in the second outer peripheral portion from rear ends of the plurality of second cutting edges toward the rear end of the cutting portion, and a plurality of second rake surfaces located between the plurality of second cutting edges and the plurality of second flutes, each of the plurality of second rake surfaces includes a second central surface and a second outward surface which is located closer to the second outer peripheral portion than the second central surface, in the second central surface, a length W2 of the second rake surface in a direction parallel to the rotation axis decreases as going to the second outer peripheral portion, and in the second outward surface, the length W2 of the second rake surface increases as going to the second outer peripheral portion.

A method of manufacturing a machined product according to an embodiment of the invention includes rotating the drill; bringing the plurality of second cutting edges of the drill being rotated and a workpiece into contact with each other; and relatively separating the workpiece and the drill from each other.

In the drill according to the embodiment of the invention, each of the second rake surfaces located on the side of the rear ends of the plurality of second cutting edges located on the step includes the second central surface and the second outward surface located closer to the second outer peripheral portion than the second central surface. In the second central surface, the length W2 of the second rake surface in the direction parallel to the rotation axis decreases as going to the second outer peripheral portion. In the second outward surface, the length W2 of the second rake surface increases as going to the second outer peripheral portion. Therefore, the end of the second flute located on the side of the second cutting edge has a convex shape projecting toward the second cutting edge as approaching the boundary between the second central surface and the second outward surface. According to this configuration, if chip produced from the second cutting edge are sent in the discharging direction of the chip to some extent, the chip pass through the second rake surface and the end of the second flute on the side of the second cutting edges at the same time. A part of the chip which pass through the second flute located in the vicinity of the end on the side of the second cutting edges is curved along the shape of the second flute, and a width of the chip becomes smaller than a length of the second cutting edge. As a result, chip smoothly pass through an interior of the second flute, and it is possible to enhance the discharging performance of chip.

Generally, in a hole working operation using a hand drill, to compensate a power shortage, there is employed a working method in which a prepared hole having a diameter smaller than that of a desired hole is formed in a workpiece, and a desired diameter is formed from above the prepared hole. From a viewpoint of compensation of the power shortage, it is preferable that the prepared hole is penetrated, but the prepared hole may not be penetrated. The drill according to the embodiment of the invention has excellent chip-discharging performance due to the above-described reason. Therefore, when a through hole is formed, it is possible to prevent the hole which is being formed from being clogged with chip produced. Hence, if the invention is applied to a hand drill for example, a working step for a prepared hole can be omitted, the producing cost can be reduced, and it is possible to avoid generation of variation in quality caused by a mix-up between a diameter of a prepared hole based on the first cutting edge and a finally worked diameter based on the second cutting edge.

DETAILED DESCRIPTION OF PREFERRED EMBODIMENTS

<Drill>

A drill according to an embodiment of the present invention will be described in detail using FIGS. 1 to 4.

Figure 1:
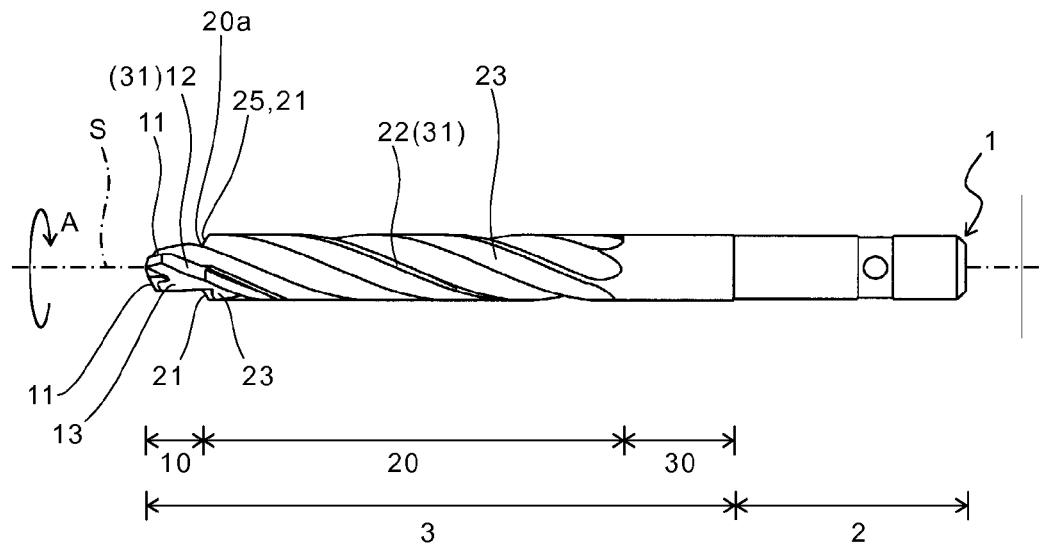
FIG. 1 is a side view showing a drill according to an embodiment of the present invention.

As shown in FIG. 1, a drill 1 of the embodiment can rotate around a rotation axis S in a direction of an arrow A, and includes a shank portion 2 and a cutting portion 3 in this order from its base end.

The shank portion 2 is grasped by a rotation shaft of a machine tool, and is located at the base end of the drill 1. Examples of the machine tool which grasps the shank portion 2 are a hand drill and a machining center, and especially the hand drill is preferable.

The cutting portion 3 comes into contact with a workpiece, and is located on a side of one end of the shank portion 2. The cutting portion 3 of the embodiment is substantially cylindrical in shape, and includes a first region 10 located at a front end portion of the drill 1, and a second region 20 which is continuous with the first region 10.

The first region 10 includes a plurality of first cutting edges 11 located on the tip end of the drill 1, a first outer peripheral portion 12 located at the first region 10 of an outer peripheral portion 31 of the cutting portion 3, and a plurality of first flutes 13 spirally located in the first outer peripheral portion 12 extending from rear ends of the first cutting edges 11 toward a rear end of the cutting portion 3, i.e., toward the shank portion 2.

Figure 2:
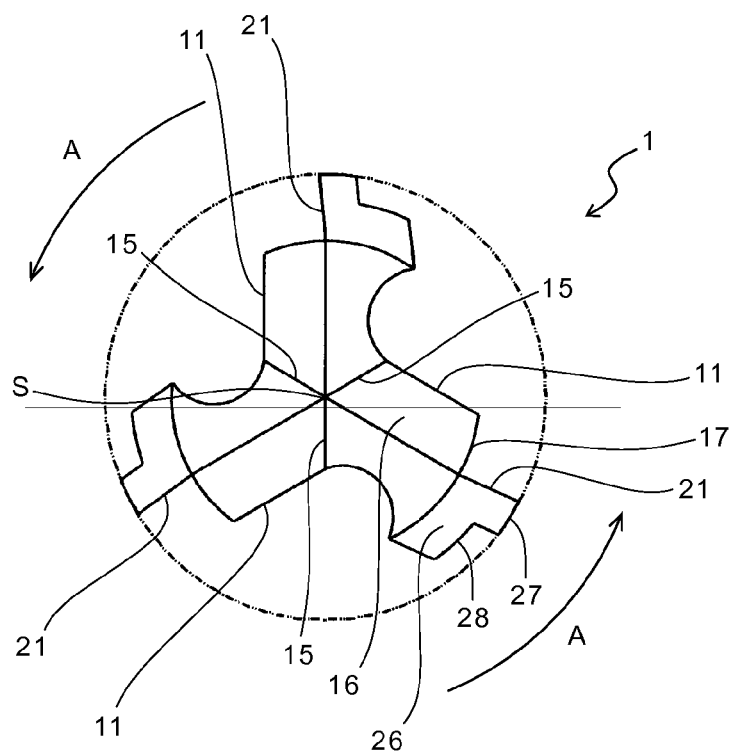
FIG. 2 is an enlarged view of a front end of the drill shown in FIG. 1.

As shown in FIG. 2, the plurality of first cutting edges 11 are located at distances from one another symmetrically with respect to the rotation axis S in a front end view. The term "in a front end view" means that the drill 1 is viewed from the front end portion of drill 1. In this embodiment, the number of the first cutting edges 11 is three, and the three first cutting edges 11 are located in a rotationally symmetric relation with respect to the rotation axis S at 120° intervals from one another as viewed from the front end. According to this configuration, it is possible to enhance a straight travelling stability of the drill 1 when a workpiece is machined. The number of the first cutting edges 11 is not limited to three, and the number can usually freely be selected from a range from two to five.

Figure 3A:
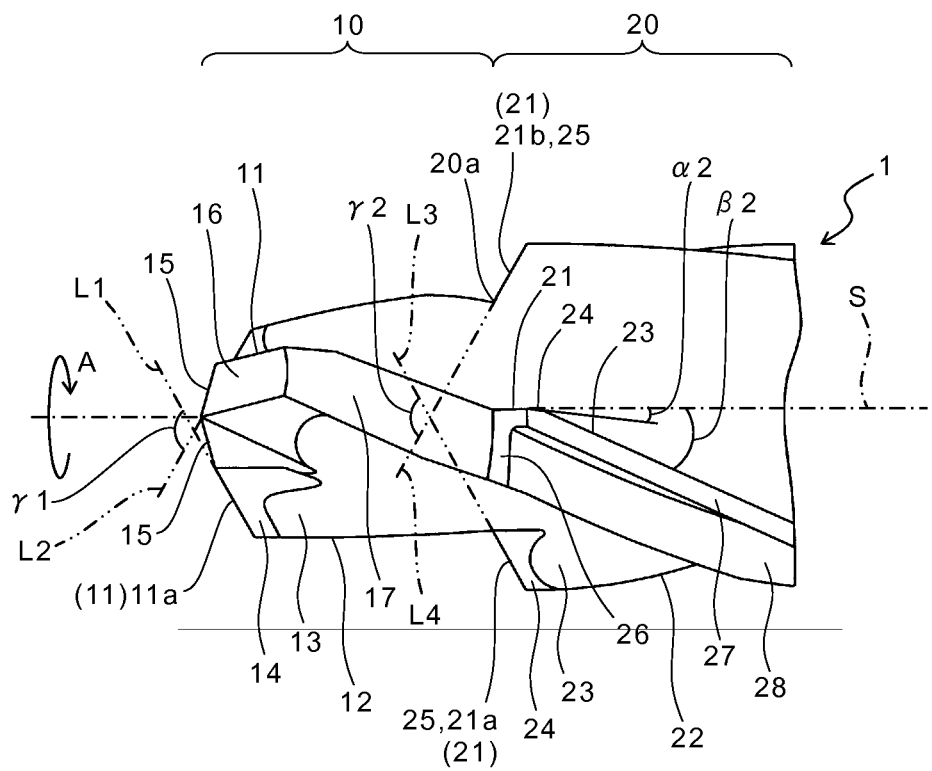
FIGS. 3A and 3B are partially enlarged side views of a vicinity of a front end portion of the drill shown in FIG. 1 as viewed from different directions.

In this embodiment, as shown in FIG. 3A, an angle γ1 formed between phantom extension lines L1 and L2 of a pair of first cutting edges 11a and 11b (not shown) of the plurality of first cutting edges 11 which are most separated from each other is an obtuse angle in a view from a direction perpendicular to the rotation axis S. According to this angle, it is possible to enhance the operability of the drill 1 and biting performance of the drill 1 into a workpiece. A preferable value of the angle γ1 is about 100 to 140°.

Chips produced from the plurality of first cutting edges 11 are discharged to a rear end of the cutting portion 3 through the plurality of first flutes 13. The plurality of first flutes 13 are located corresponding to the plurality of first cutting edges 11. Therefore, the number of the plurality of first flutes 13 is the same as the number of the plurality of first cutting edges 11. In this embodiment, three first flutes 13 are located corresponding to three first cutting edges 11. The plurality of first flutes 13 of the embodiment are separated from one another over an entire length of the first region 10.

Each of the plurality of first flutes 13 has a helix angle β1 (not shown). The helix angle β1 means an angle formed between the first flute 13 and the rotation axis S when the drill 1 is viewed from a position where an end of one of the first cutting edges 11 that is located on the side of the first outer peripheral portion 12 is the highest. The high position means a high position in a radial direction which is perpendicular to the rotation axis S of the drill 1. A preferable value of the helix angle β1 is about 10 to 45°.

As shown in FIGS. 2 and 3A, the first region 10 of the embodiment further includes a biting portion 15 located on the front end of the drill 1 at a location on the side of the rotation axis S. The biting portion 15 enhances the biting performance into a workpiece, and is formed by thinning a chisel-edge to reduce its thickness. The chisel-edge means a portion formed by intersecting, with each other, ends of the plurality of first cutting edges 11 located on the side of the rotation axis S. In this embodiment, the biting portion 15 is constituted by thinning the chisel-edge such that the chisel-edge does not remain. All of the first cutting edges 11 are continuous with the biting portion 15. According to this configuration, it is possible to enhance the biting performance into a workpiece. The thinning operation is not limited to the manner in which the chisel-edge does not remain, and a portion of the chisel-edge may remain depending upon composition of a workpiece and a cutting condition.

As shown in FIGS. 2 and 3, the first region 10 of the embodiment further includes first flank faces 16 located rearward of the first cutting edge 11 in the rotation direction A of the drill 1. Each of the first flank faces 16 avoids contact with a workpiece and functions to reduce a cutting resistance, and has a predetermined clearance angle. The clearance angle of the first flank face 16 means an angle formed between the first flank face 16 and a reference surface (not shown) which is perpendicular to the rotation axis S. A preferable value of the clearance angle of the first flank face 16 is about 5 to 20°.

The first region 10 of the embodiment further includes first margins 17 located in regions of the first outer peripheral portion 12 where there is no first flute 13. Each of the first margins 17 comes into slide contact with an inner wall surface of a machining hole when a workpiece is cut by the first cutting edge 11 and enhances the operability of the drill 1.

The second region 20 includes a step 25. A diameter of the step 25 increases as going from the first region 10 to a rear end of the second region 20 in a sectional view perpendicular to the rotation axis S. As shown in FIG. 1, an end 20a of the second region 20 on the side of the step 25 is continuous with the first region 10, and the diameter of the end 20a is greater than that of the first region 10.

The second region 20 includes a plurality of second cutting edges 21 located on the step 25, a second outer peripheral portion 22 located in the second region 20 on the outer peripheral portion 31, and a plurality of second flutes 23 spirally located in the second outer peripheral portion 22 from rear ends of the plurality of second cutting edges 21 toward a rear end of the cutting portion 3.

Like the plurality of first cutting edges 11, the plurality of second cutting edges 21 are located at predetermined distances from one another in a rotationally symmetric relation with respect to the rotation axis S in a front end view. More specifically, in this embodiment, as shown in FIG. 2, the number of the second cutting edges 21 is three, and the three second cutting edges 21 are located rotationally symmetric at 120° intervals from one another with respect to the rotation axis S in a front end view. According to this configuration, it is possible to enhance the straight travelling stability when a workpiece is machined.

In this embodiment, like the plurality of first cutting edges 11, the number of the plurality of second cutting edges 21 is three. According to this configuration also, it is possible to enhance the straight travelling stability when a workpiece is machined. The number of the second cutting edges 21 is not limited to three, and the number can usually freely be selected from a range from two to five. The numbers of the first cutting edges 11 and the second cutting edges 21 need not be the same, and the numbers may be different from each other depending upon composition of a workpiece and a cutting condition.

In this embodiment, as shown in FIG. 3A, an angle $\gamma 2$ formed between phantom extension lines L3 and L4 of a pair of second cutting edges 21$a$ and 21$b$ of the plurality of second cutting edges 21 which are most separated from each other is an obtuse angle in a view from a direction perpendicular to the rotation axis S. According to this configuration, like the effect exerted by the above-described angle $\gamma 1$, it is possible to enhance the operability of the drill 1 and biting performance of the drill 1 into a workpiece. A preferable value of the angle $\gamma 2$ is about 100 to 140°.

In this embodiment, the angles $\gamma 1$ and $\gamma 2$ have a relation of $\gamma 1 = \gamma 2$. According to this relation, it is possible to further enhance the operability of the drill 1 in cooperation with the effects of the angles $\gamma 1$ and $\gamma 2$. The angles $\gamma 1$ and $\gamma 2$ need not be the same, and they may be different from each other depending upon composition of a workpiece and a cutting condition.

As shown in FIG. 2, all of the second cutting edges 21 are shorter than the plurality of first cutting edges 11. In other words, all of the plurality of first cutting edges 11 are longer than the plurality of second cutting edges 21. A circumferential velocity of the second cutting edge 21 is relatively fast and the second cutting edge 21 is prone to receive a load but according to the above-described configuration; however, it is possible to restrain the second cutting edge 21 from becoming fractured.

All of chips produced from the plurality of second cutting edges 21 are discharged toward the rear end of the cutting portion 3 through the plurality of second flutes 23. The plurality of second flutes 23 are located corresponding to the plurality of second cutting edges 21. Therefore, the number of the plurality of second flutes 23 is the same as that of the plurality of second cutting edges 21. In this embodiment, three second flutes 23 are located respectively corresponding to three second cutting edges 21. The plurality of second flutes 23 of this embodiment are separated from one another over an entire length of the second region 20.

Figure 3B:
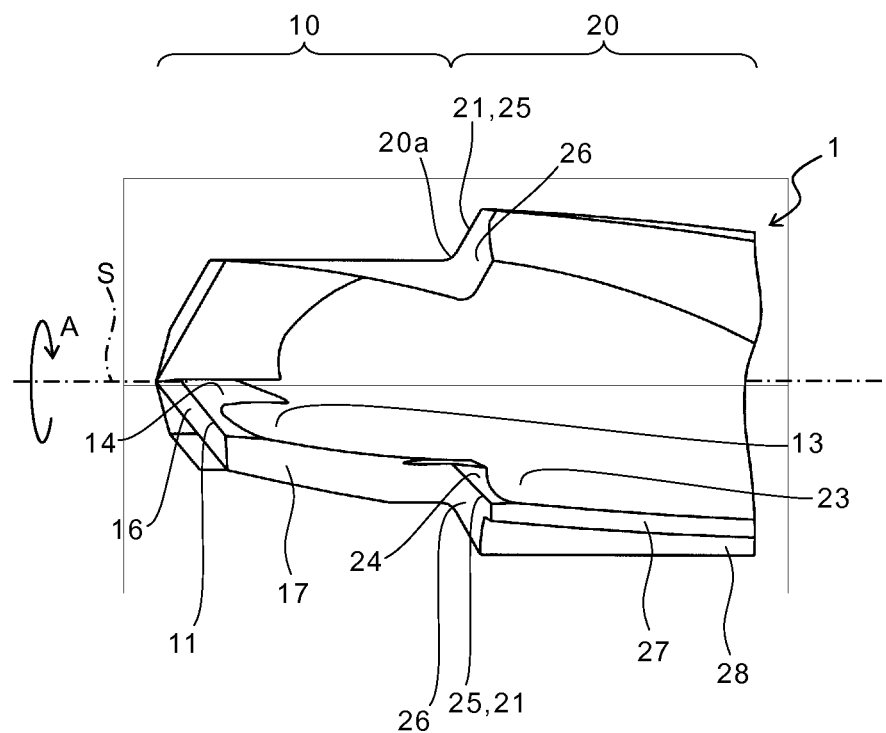

As shown in FIG. 3B, all of the second flutes 23 are continuous from the corresponding first flutes 13, respectively. According to this configuration, it is possible to collectively discharge chip produced from the first cutting edges 11 and the second cutting edges 21 toward the rear end of the cutting portion 3. The first flutes 13 and the second flutes 23 need not continuous with each other, and they may be separated from each other depending upon composition of a workpiece and a cutting condition.

As shown in FIG. 3A, all of the plurality of second flutes 23 have helix angles $\beta 2$. Like the helix angle $\beta 1$, the helix angle $\beta 2$ means an angle formed between the second flute 23 and the rotation axis S when the drill 1 is viewed from a position where an end of the second cutting edge 21 on the side of the second outer peripheral portion 22 becomes the highest. A preferable value of the helix angle $\beta 2$ is about 10 to 45°.

In this embodiment, the helix angles $\beta 1$ and $\beta 2$ have a relation of $\beta 1 = \beta 2$. According to this relation, produced chip is smoothly discharged toward the rear end of the cutting portion 3 through the first flutes 13 and the second flutes 23. The helix angles $\beta 1$ and $\beta 2$ need not be the same, and they may be different from each other depending upon composition of a workpiece and a cutting condition.

As shown in FIGS. 2 and 3, the second region 20 of this embodiment further includes second flank faces 26 located rearward of the second cutting edge 21 in the rotation direction A of the drill 1. Like the first flank face 16, each of the second flank faces 26 avoids contact with a workpiece and functions to reduce a cutting resistance, and has a predetermined clearance angle. Like the first flank face 16, the clearance angle of the second flank face 26 means an angle formed between the second flank face 26 and a reference surface (not shown) which is perpendicular to the rotation axis S. A preferable value of the clearance angle of the second flank face 26 is about 5 to 20°.

The second region 20 of the embodiment further includes second margins 27 and clearances 28 in regions of the second outer peripheral portion 22 where there is no second flute 23. Like the first margin 17, each of the second margins 27 comes into slide contact with an inner wall surface of a machining hole when a workpiece is cut to enhance the operability of the drill 1. Each of the clearances 28 is located rearward of the second margin 27 in the rotation direction A of the drill 1. From a viewpoint of reduction in cutting resistance, a diameter of the clearance 28 is smaller than that of the second margin 27 in a sectional view perpendicular to the rotation axis S.

Figure 4:
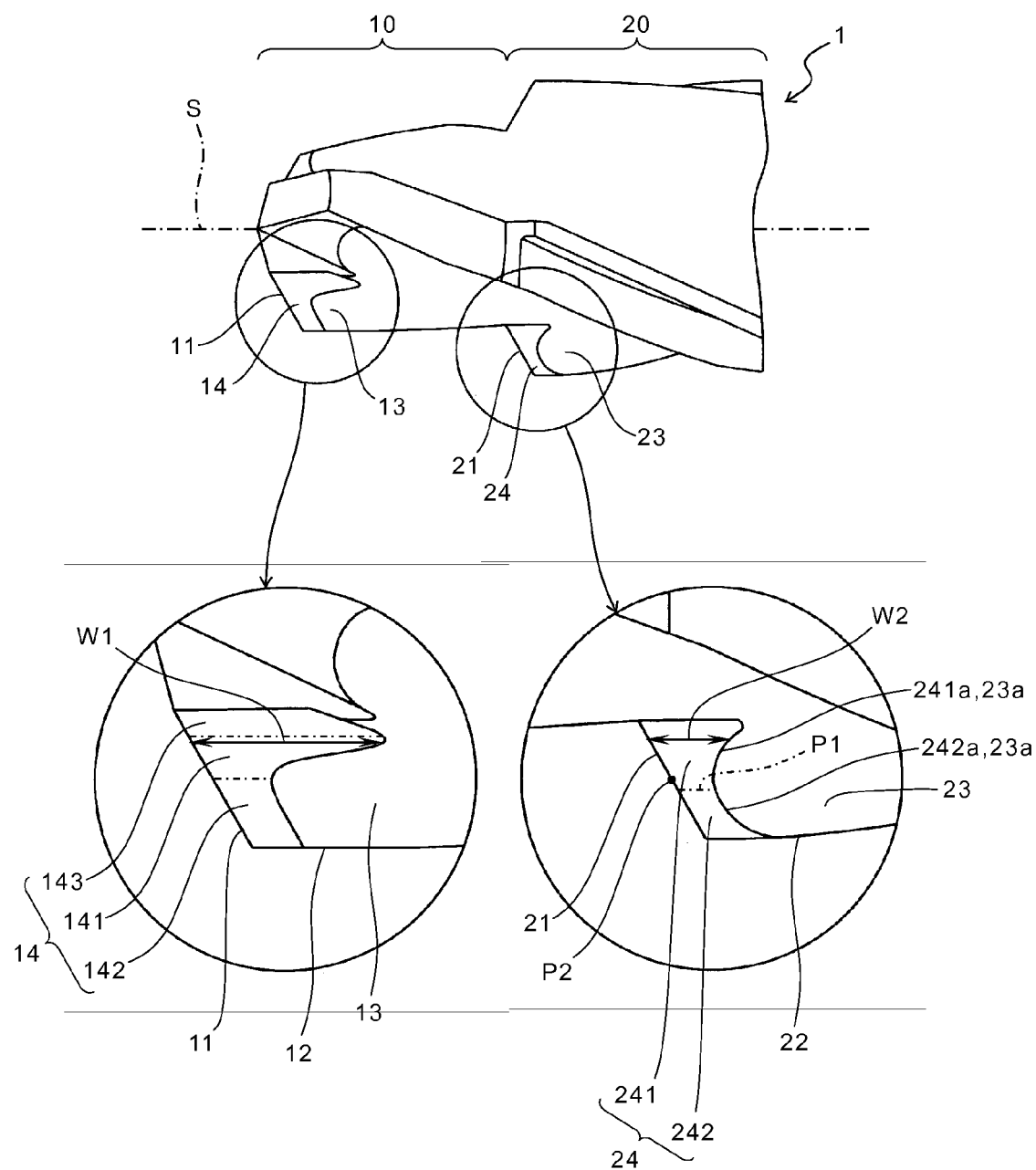
FIG. 4 is a partially enlarged explanatory diagram showing the vicinity of the front end portion of the drill shown in FIG. 1.

As shown in FIG. 4, the second region 20 of the embodiment further includes a plurality of second rake surfaces 24 located between the plurality of second cutting edges 21 and the plurality of second flutes 23. The plurality of second rake surfaces 24 stabilize a discharging direction of chip produced from the second cutting edge 21, secure the strength of the second cutting edge 21, and restrain the second cutting edge 21 from becoming fractured.

Each of the plurality of second rake surfaces 24 includes a second central surface 241 and a second outward surface 242. In the second central surface 241, a length W2 of the second rake surface 24 in a direction parallel to the rotation axis S decreases as going to the second outer peripheral portion 22. The second outward surface 242 is located closer to the second central surface 241 than the second outer peripheral portion 22. In the second outward surface 242, the length W2 of the second rake surface 24 increases as going to the second outer peripheral portion 22. According to this configuration, a shape formed by a boundary 241$a$ between the second central surface 241 and the second flute 23 and a boundary 242$a$ between the second outward surface 242 and the second flute 23 becomes a convex shape projecting toward the second cutting edge 21. That is, an end 23$a$ of the second flute 23 located on the side of the second cutting edge 21 has a convex shape projecting toward the second cutting edge 21 as approaching a boundary P1 between the second central surface 241 and the second outward surface 242.

According to this configuration, if chip produced from the second cutting edge 21 are sent in the discharging direction of the chip to some extent, the chip pass through the second rake surface 24 and the end 23$a$ of the second flute 23 at the same time. A part of the chip which pass through the second flute 23 located in the vicinity of the end 23$a$ is curved along the shape of the second flute 23, and widths of the chip become smaller than the length of the second cutting edge 21. As a result, chip smoothly pass through the second flute 23, and discharging performance of chip can be enhanced. It is preferable that the end 23a is curved in a convex form projecting toward the second cutting edge 21 as approaching the boundary P1 as in this embodiment. By forming the end 23a into the curved shape, further smooth discharging property of chip can be exerted.

In the embodiment, the boundary P1 between the second central surface 241 and the second outward surface 242 is located closer to the second outer peripheral portion 22 than a midpoint P2 of the second cutting edge 21. According to this configuration, it is possible to stabilize the discharging direction of chip produced from the second cutting edge 21, and it becomes easy to curve the chip along the shape of the second flute 23.

In this embodiment, as shown in FIG. 3A, each of the plurality of second rake surfaces 24 has a rake angle α2. The rake angle α2 means an angle formed between the second rake surface 24 and the rotation axis S when the drill 1 is viewed from a position where the end of the second cutting edge 21 located on the side of the second outer peripheral portion 22 becomes the highest. From a viewpoint of suppression of increase in cutting resistance, the rake angle α2 is preferably in a range of about 0 to 10°, and more preferably in a range of 3 to 7°.

The rake angle α2 is determined based on a condition that rearward inclination in the rotation direction A of the drill 1 is defined as positive, and forward inclination in the rotation direction A is defined as negative. The rake angle α2 of the embodiment is a positive rake angle.

The rake angle α2 and the helix angle β2 of the embodiment have a relation of α2<β2. According to this configuration also, like the effect exerted by the boundary P1, it is possible to stabilize the discharging direction of chip produced from the second cutting edge 21, and to make it easy to curve the chip along the shape of the second flute 23.

In the embodiment, as shown FIG. 4, the first region 10 also further includes a plurality of first rake surfaces 14 located between the plurality of first cutting edges 11 and the plurality of first flutes 13 like the second region 20. Like the second rake surface 24, each of the first rake surfaces 14 includes a first central surface 141 and a first outward surface 142. In the first central surface 141, a length W1 of the first rake surface 14 in a direction parallel to the rotation axis S decreases as going to the first outer peripheral portion 12. The first central surface 142 is located closer to the first outer peripheral portion 12 than the first central surface 141. In the first outward surface 142, the length W1 of the second rake surface 24 increases as going to the first outer peripheral portion 12. Therefore, from the same reason as that described concerning the second rake surface 24, chip produced from the first cutting edge 11 smoothly pass through the first flute 13 and discharging property of chip can further be enhanced.

In the embodiment, each of the plurality of first rake surfaces 14 includes a first inward surface 143 which is located closer to the rotation axis S than the first central surface 141. In the first inward surface 143, the length W1 of the first rake surface 14 increases as going to the first outer peripheral portion 12. According to this configuration, it is possible to stabilize the discharging direction of chip produced from the first cutting edge 11, and it becomes easy to curve the chip along the shape of the first flute 13.

Each of the plurality of first rake surfaces 14 includes a rake angle α1 (not shown). Like the rake angle α2, the rake angle α1 is an angle formed between the first rake surface 14 and the rotation axis S when the drill 1 is viewed from a position where an end of the first cutting edge 11 located on the side of the first outer peripheral portion 12 becomes the highest. From a viewpoint of suppression of increase in the cutting resistance, the rake angle α1 is preferably in a range of about 0 to 10°, and more preferably in a range of 3 to 7°. Like the rake angle α2, the rake angle α1 of the embodiment is a positive rake angle.

The rake angle α1 and the helix angle β1 of the embodiment have a relation of α1<β1. According to this configuration also, it is possible to stabilize the discharging direction of chip produced from the first cutting edge 11, and to make it easy to curve the chip along the shape of the first flute 13.

The rake angle α1 and the rake angle α2 of the embodiment have a relational α1=α2. According to this configuration, it is possible to restrain the cutting resistance from increasing, and to continuously smoothly carry out the expanding working of a hole from the first region 10 to the second region 20. The rake angles α1 and α2 need not be the same, and they may be different from each other depending upon composition of a workpiece and a cutting condition.

As shown in FIG. 1, the cutting portion 3 of the embodiment further includes a third region 30 in addition to the first region 10 and the second region 20. The third region 30 is continuous with the second region 20. The third region 30 is designed in accordance with a shape of the shank portion 2 and the depth of a through hole to be formed.

<Method of Manufacturing Machined Product>

Next, a method of manufacturing a machined product according to the embodiment of the present invention will be described using FIG. 5.

Figure 5A:
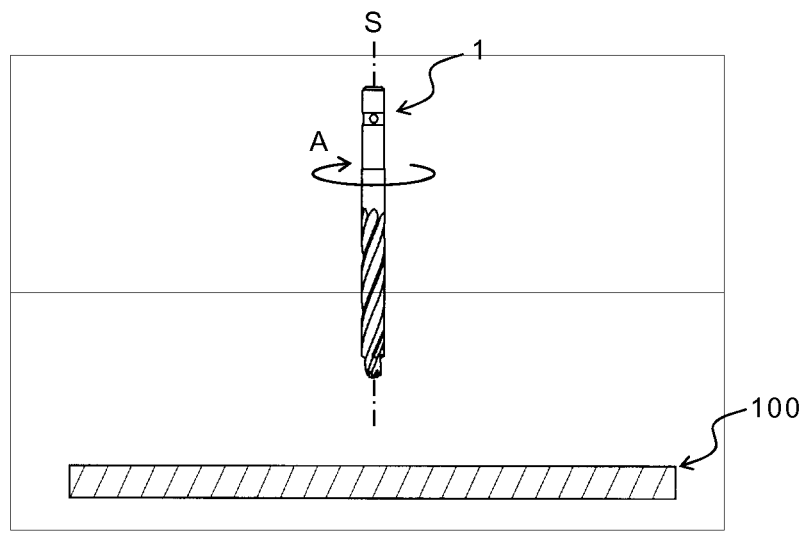
FIGS. 5A to 5C are explanatory diagrams showing a method of manufacturing a machined product according to the embodiment of the invention in order of steps.

As shown in FIG. 5A, the drill 1 is first rotated in the direction of the arrow A around the rotation axis S.

Figure 5B:
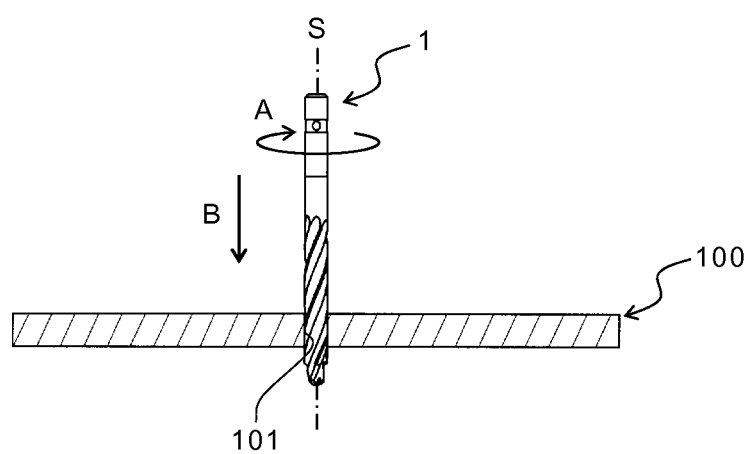

Next, as shown in FIG. 5B, the drill 1 is sent in a direction of an arrow B, the plurality of first cutting edges 11, the plurality of second cutting edges 21 of the drill 1 and a workpiece 100 are brought into contact with each other, thereby forming a through hole 101. Due to the above-described reason, since the drill 1 has excellent discharging property of chip, it is possible to prevent the through hole 101 from being clogged with chip produced when forming the through hole 101, and it is possible to form the through hole 101 having excellent working precision while restraining the first cutting edge 11 and the second cutting edge 21 from becoming fractured.

It is preferable that the workpiece 100 is a laminate formed by laminating, on each other, at least two kinds of layers selected from a carbon fiber reinforced plastic layer, a titanium layer and an aluminum layer. Such a workpiece 100 is used as constituent members of airplanes for example.

Figure 5C:
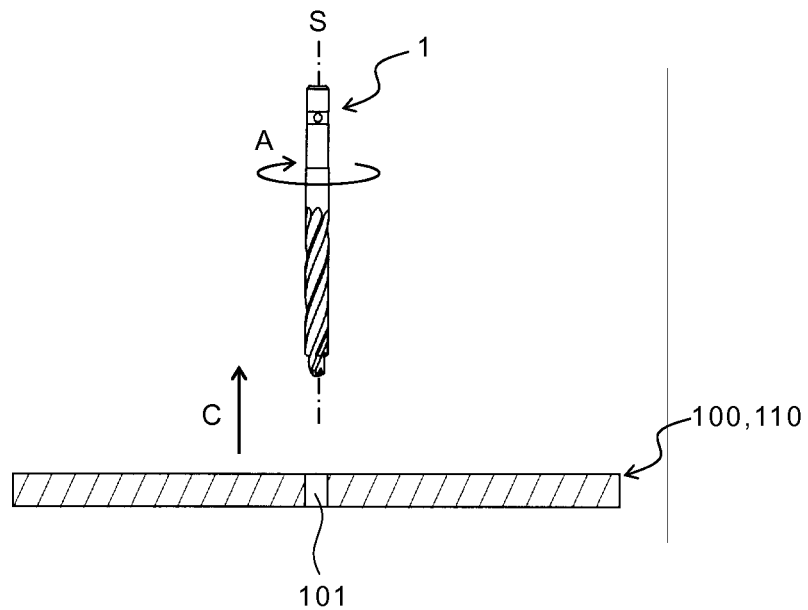
Figure 6:
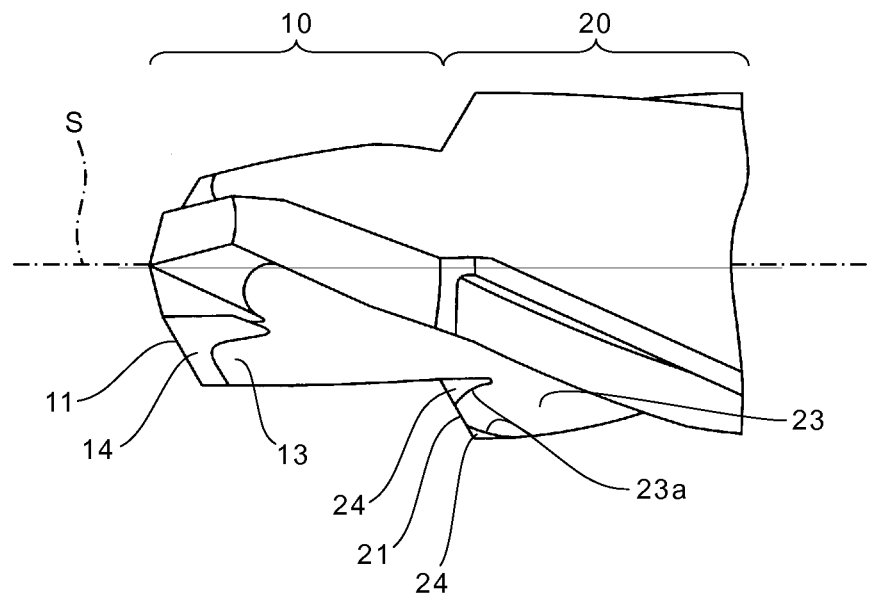
FIG. 6 is a partially enlarged side view showing a vicinity of a front end portion of a drill according to another embodiment of the invention.

Lastly, as shown in FIG. 5C, the drill 1 is pulled out from the through hole 101 in a direction of an arrow C, the workpiece 100 and the drill 1 are relatively separated from each other.

Through the above-described steps, it is possible to obtain a desired machined product 110 by cutting the workpiece 100. When the cutting working is to be continued, the state where the drill 1 rotates is maintained, a step of bringing the plurality of first cutting edges 11 and the plurality of second cutting edges 21 of the drill 1 into contact with different locations of the workpiece 100 may be repeated.

The present invention is not limited to the above-described embodiment, and the invention can variously be modified and changed within a range of the invention of course.

For example, in the embodiment, the first region 10 includes the plurality of first rake surfaces 14 located between the plurality of first cutting edges 11 and the plurality of first flutes 13. In stead of this configuration, all of the plurality of first flutes 13 may be continuous with the plurality of first cutting edges 11. According to this configuration, it is possible to further enhance the biting performance into a workpiece. In the case of this embodiment, it is preferable that a portion of the first flute 13 located on the side of the first cutting edge 11 has the same configuration as that of the first rake surface 14. Other configuration is the same as that of the drill 1 of the above-described embodiment.

Of the first rake surface 14 and the second rake surface 24, only the first rake surface 14 has the first inward surface 143 in the embodiment. Instead of this configuration, the second rake surface 24 may also include a second inward surface. That is, each of the second rake surfaces 24 may include a second inward surface which is located closer to the rotation axis S than the second central surface 241 and in the second inward surface, the length W2 of the second rake surface 24 increases as going to the second outer peripheral portion 22. According to this configuration, when the length of the second cutting edge 21 is relatively long, it is possible to stabilize the discharging direction of chip produced from the second cutting edge 21, and to make it easy to curve the chip along the shape of the second flute 23. Other configuration is the same as that of the drill 1 of the embodiment.

The ends 23a of the second flutes 23 are located between the second cutting edges 21 at predetermined intervals in the embodiment. Instead of this configuration, a portion of the end 23a may be located such that it is in contact with the second cutting edge 21. According to this configuration, sharp performance is enhanced and in addition to this, a chip-involving effect can further be enhanced. Other configuration is the same as that of the drill 1 of the above-described embodiment.

Figure 7:
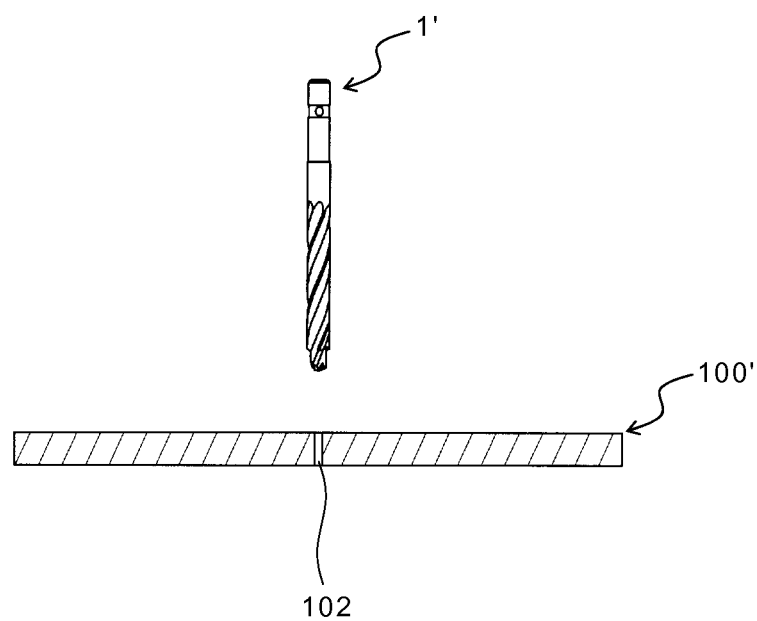
FIG. 7 is an explanatory diagram showing a method of manufacturing a machined product according to another embodiment of the invention.

The biting portion 15 is provided by thinning the chisel-edge in the embodiment but instead of this configuration, the biting portion 15 may be omitted. That is, the chisel-edge may not be thinned and only the chisel-edge is provided. In the case of this configuration, to enhance the biting performance into a workpiece, it is preferable that the above-described producing method of a cut product includes a step shown in FIG. 7 before the step shown in FIG. 5A. That is, it is preferable that a producing method of a cut product according to another embodiment of the invention further includes a step of preparing a workpiece 100' provided at a surface thereof with a prepared hole 102 having a diameter smaller than that of a front end portion of a drill 1'. The prepared hole 102 of this embodiment is constituted by a through hole which penetrates the workpiece 100' between its front surface and back surface, but the invention is not limited to this configuration, and the workpiece 100' can be provided at its surface with an opening. Other configuration is the same as that of the drill 1 and the producing method of a cut product according to the above-described embodiment.

What is claimed is:

1. A drill, comprising:
    a substantially cylindrical cutting portion comprising
        a first region located at a front end portion, and
        a second region which has a step whose diameter increases as going from the first region to a rear end in a sectional view perpendicular to a rotation axis, and which is continuous with the first region in an end of the second region on a side of the step,
    wherein the first region comprises
        a plurality of first cutting edges located at a front end,
        a first outer peripheral portion located at an outer peripheral portion of the cutting portion,
        a plurality of first flutes spirally located in the first outer peripheral portion from rear ends of the plurality of first cutting edges toward the rear end of the cutting portion, and
        a plurality of first rake surfaces located between the plurality of first cutting edges and the plurality of first flutes and not abutting the rotation axis,
        each of the plurality of first rake surfaces comprising
            a first central surface, which is connected to an inner end of one of the plurality of first cutting edges, and
            a first outward surface which is located closer to the first outer peripheral portion than the first central surface and is connected to an outer end of the one first cutting edge,
        wherein, in the first central surface, a length of the first rake surface in a direction parallel to the rotation axis increases as going inward from the first outer peripheral portion, and
        wherein, in the first outward surface, the length of the first rake surface increases, as going to the first outer peripheral portion, the second region comprises
    a plurality of second cutting edges located at the step,
    a second outer peripheral portion located at the outer peripheral portion of the cutting portion,
    a plurality of second flutes spirally located in the second outer peripheral portion from rear ends of the plurality of second cutting edges toward the rear end of the cutting portion, and
    a plurality of second rake surfaces located between the plurality of second cutting edges and the plurality of second flutes and not abutting the rotation axis,
    each of the plurality of second rake surfaces comprising
        a second central surface, which is connected to an inner end of one of the plurality of second cutting edges, and
        a second outward surface which is located closer to the second outer peripheral portion than the second central surface and is connected to an outer end of the one second cutting edge,
        wherein, in the second central surface, a length of the second rake surface in a direction parallel to the rotation axis decreases as going to the second outer peripheral portion, and
        wherein, in the second outward surface, the length of the second rake surface increases as going to the second outer peripheral portion,
wherein the second rake surface does not have a surface closer to the rotation axis than the second central surface,
wherein a rear end of the first central surface is located closer to the rear end of the cutting portion than a rear end of the first outward surface, and
wherein a rear end of the second outward surface is located closer to the rear end of the cutting portion than a rear end of the second central surface,
wherein, for each of the plurality of first rake surfaces, in a direction parallel to a corresponding one of the plurality of first cutting edges and in a portion most adjacent to the corresponding first cutting edge, a width of the first central surface is smaller than a width of the first outward surface, and wherein, for each of the plurality of second rake surfaces, in a direction parallel to a corresponding one of the plurality of second cutting edges and in a portion most adjacent to the corresponding second cutting edge, a width of the second central surface is larger than a width of the second outward surface.

2. The drill according to claim 1, wherein a shape formed by a boundary between the second central surface and the second flute and a boundary between the second outward surface and the second flute is a convex shape projecting toward the second cutting edge.

3. The drill according to claim 1, wherein a boundary between the second central surface and the second outward surface is located closer to the second outer peripheral portion than a midpoint of the second cutting edge.

4. The drill according to claim 1, wherein each of the plurality of second rake surfaces has a rake angle $\alpha 2$, each of the plurality of second flutes has a helix angle $\beta 2$, and the rake angle $\alpha 2$ and the helix angle $\beta 2$ have a relation of $\alpha 2 < \beta 2$.

5. The drill according to claim 1, wherein each of the plurality of first rake surfaces further comprises a first inward surface located closer to the rotation axis than the first central surface, and in the first inward surface, the length increases as going to the first outer peripheral portion.

6. The drill according to claim 1, wherein each of the plurality of first rake surfaces has a rake angle $\alpha 1$, each of the first flutes has a helix angle $\beta 1$, and the rake angle $\alpha 1$ and the helix angle $\beta 1$ have a relation of $\alpha 1 < \beta 1$.

7. The drill according to claim 1, wherein each of the plurality of first rake surfaces has a rake angle $\alpha 1$, each of the second rake surfaces has a rake angle $\alpha 2$, and the rake angle $\alpha 1$ and the rake angle $\alpha 2$ have a relation of $\alpha 1 = \alpha 2$.

8. The drill according to claim 1, wherein the first region further comprises a biting portion located at a side of the rotation axis in the front end.

9. The drill according to claim 8, wherein each of the plurality of first cutting edges is continuous with the biting portion.

10. The drill according to claim 1, wherein the plurality of first cutting edges are longer than the plurality of second cutting edges.

11. The drill according to claim 1, wherein the number of the plurality of first cutting edges and the number of the plurality of second cutting edges are the same.

12. The drill according to claim 1, wherein an angle formed between extension lines of two of the plurality of first cutting edges which are most separated from each other is an obtuse angle in a view from a direction perpendicular to the rotation axis.

13. The drill according to claim 1, wherein an angle formed between extension lines of two of the second cutting edges which are most separated from each other is an obtuse angle in a view from a direction perpendicular to the rotation axis.

14. The drill according to claim 1, wherein the plurality of first flutes are continuous from the plurality of first cutting edges, respectively.

15. The drill according to claim 8, wherein the biting portion is located between the rotation axis and the plurality of first rake surfaces.

16. A method of manufacturing a machined product, comprising:

rotating a drill according to claim 1;

bringing the plurality of second cutting edges of the drill being rotated and a workpiece into contact with each other; and relatively separating the workpiece and the drill from each other.

17. The method of manufacturing a machined product according to claim 16, further comprising a step of bringing the plurality of first cutting edges of the drill being rotated and the workpiece into contact with each other.

18. The method of manufacturing a machined product according to claim 16, further comprising a step of preparing the workpiece with a prepared hole at a surface thereof, the prepared hole having a diameter smaller than that of the front end portion.

19. The method of manufacturing a machined product according to claim 16, wherein the workpiece is a laminate formed by laminating at least two kinds of layers selected from a carbon fiber reinforced plastic layer, a titanium layer and an aluminum layer.

* * * * *